US006636974B1

(12) United States Patent
Hong

(10) Patent No.: US 6,636,974 B1
(45) Date of Patent: Oct. 21, 2003

(54) METHOD FOR AUTOMATICALLY STORING FIRST USE DATE OF ELECTRONIC DEVICE

(75) Inventor: Joon-kee Hong, Suwon (KR)

(73) Assignee: Samsung Electronics Co, Ltd., Kyungki-do (KR)

(*) Notice: Subject to any disclaimer, the term of this patent is extended or adjusted under 35 U.S.C. 154(b) by 0 days.

(21) Appl. No.: 09/332,142

(22) Filed: Jun. 14, 1999

(30) Foreign Application Priority Data

Jun. 13, 1998 (KR) ........................................ 1998-22142

(51) Int. Cl.[7] .................................................. G06F 1/24

(52) U.S. Cl. ........................ 713/202; 713/161; 713/165; 713/200; 713/201

(58) Field of Search ................................. 713/161, 165, 713/178, 200, 201, 202

(56) References Cited

U.S. PATENT DOCUMENTS 5,367,452 A * 11/1994 Gallery et al. ................ 705/28
5,495,531 A * 2/1996 Smiedt ........................ 705/59

FOREIGN PATENT DOCUMENTS

| | | | |
|---|---|---|---|
| JP | 61-50425 | 3/1986 | |
| JP | 8-297523 | 11/1996 | |
| JP | 10-150510 | 6/1998 | |
| KR | 0003382 | 6/1997 | .......... H04N/7/087 |
| WO | WO 98/07288 | 2/1998 | |

* cited by examiner

*Primary Examiner*—Thomas R. Peeso
(74) *Attorney, Agent, or Firm*—Sughrue Mion, PLLC

(57) ABSTRACT

A method for automatically storing information on the date of the first use of an electronic device after purchase for verifying the warranty period of the electronic device. When an electronic device is used for the first time after purchase, the date information necessary for verifying the warranty period is automatically stored, thereby settling disputes concerning warranty periods. Also, the cost for repairing products for which the warranty period has already elapsed can be greatly reduced.

10 Claims, 2 Drawing Sheets

METHOD FOR AUTOMATICALLY STORING FIRST USE DATE OF ELECTRONIC DEVICE

BACKGROUND OF THE INVENTION

1. Field of the Invention

The present invention relates to a method for inputting and displaying data related to the service of an electronic device, and more particularly, to a method for automatically storing information on the first date that an electronic device is used after purchase, for purposes of verifying the warranty period of the electronic device.

2. Description of the Related Art

In the event that an abnormality occurs in product quality during a predetermined warranty period, a supplier customarily repairs the defective product or replaces the same with a new one free of charge.

In servicing the defective product, in order to check whether the product is under its warranty period, a label or tag is fixed on a written guarantee or an outer surface of the product and the purchase date of the product is written thereon by vendors. However, vendors seldom write the purchase date on the written guarantee, label or tag. Also, even when vendors write the purchase date, customers may often lose the written guarantee, label or tag indicating the purchase date.

A problem occurs because some customers intentionally discard the written guarantee and request free servicing, even if the warranty period has expired. Although improper, this practice is quite common in practice.

Most Korean domestic suppliers of electronic appliances and products render a two-year warranty period. Also, since customers seldom hold the written guarantee, it is a customary practice to grant a 30-month warranty period from the manufacturing date. However, even if the 30-month warranty period has elapsed, in order to avoid a dispute with customers who insist on a warranty, free servicing is customarily rendered. Therefore, the product suppliers incur unplanned costs in connection with these extra servicing expenses. Also, in determining the warranty period, disputes with customers frequently occur, which impairs the establishment and maintenance of good relationships with customers.

SUMMARY OF THE INVENTION

To solve the above problems, it is an object of the present invention to provide a method for automatically storing information that identifies the date when a product is used for the first time after a customer purchases the product.

Accordingly, to achieve the above object, there is provided a method for storing service information of an electronic device for receiving an input signal containing data of the present date, including the steps of (a) determining whether a predetermined command is input to a controller of the electronic device, (b) if it is determined in step (a) that the predetermined command is input, separating data of the present date contained in the input signal, (c) determining whether initial data is present in an area for storing date data out of the service information stored in a memory, and (d) only if it is determined in step (c) that the initial data is present, storing the data of the present date in the date data area.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENT

A preferred embodiment of the present invention will be described in detail with reference to the accompanying drawings.

A television broadcast station transmits data identifying time information and broadcast program information, together with video signals and audio signals, to facilitate programmed recording, etc., which is called a "data broadcasting service".

The data broadcasting service is provided by a data broadcasting system that transmits various types of digitally encoded information, which is not contained in the video or audio signals. For example, teletext, VPS (video program system), VPV (video programmed video-recorder) or KBPS (Korean Broadcasting Program System) currently are used in practice.

Compared to an audio broadcasting system or a television broadcasting system, the data broadcasting system employs a highly-efficient compression-coding method for transmitting various types of information, thereby allowing highly-efficient transmission of information.

In a data broadcasting system using audio signals, an AM broadcasting station transmits data by loading a minimum shift keying (MSK)-modulated signal to a lower frequency band and an FM broadcasting station transmits data by loading a modulated signal to the upper side band of a sub-channel.

The KBPS program data is allocated to a predetermined horizontal line according to conditions of various broadcasting stations during a vertical blanking interval (VBI) and is interleaved into either an odd field or an even field of the allocated horizontal line.

Currently, the data broadcasting system transmits only time data. However, if required, date data easily can be transmitted.

In the present invention, a data broadcasting system for transmitting both time and date data will be described.

Figure 1:
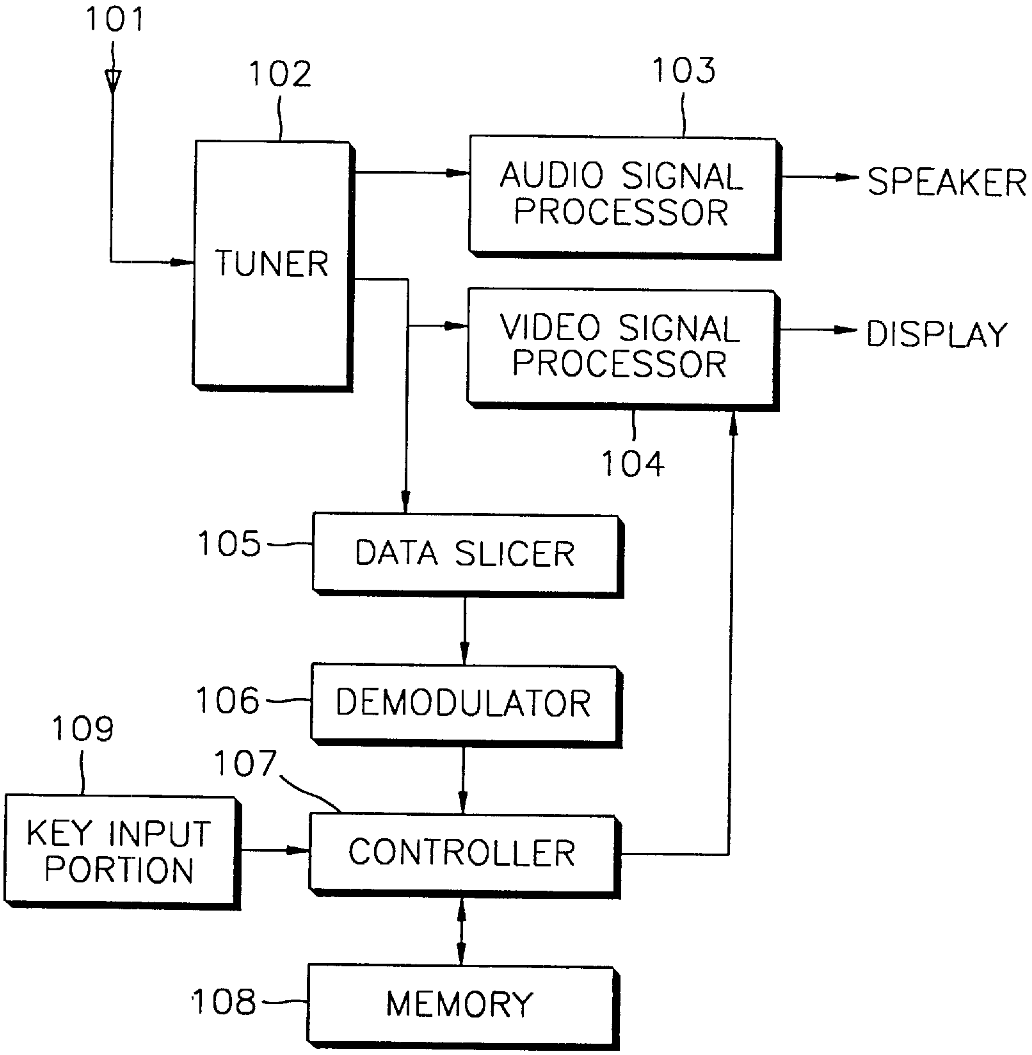
FIG. 1 is a schematic diagram illustrating a television to which a method for automatically storing information on the first use date of an electronic device according to the present invention is applied.

FIG. 1 is a schematic diagram illustrating a television to which is applied a method for automatically storing information on the first use date of an electronic device, according to the present invention. The television includes an antenna 101, a tuner 102, an audio signal processor 103, a video signal processor 104, a data slicer 105, a demodulator 106, a controller 107, a memory 108 and a key input portion 109.

Broadcast signals transmitted from a broadcasting station are received by the antenna 101 and only the broadcast signals of channels to which the tuner 102 is tuned are output by the tuner 102.

The audio signal processor 103 filters only audio signals, demodulates the filtered audio signals and outputs the same to a speaker.

The video signal processor 104 filters only video signals, separates the same into color signals and luminance signals which are demodulated, and outputs the demodulated signals to a display, such as a CRT or LCD panel.

Also, the broadcasting program data containing date data present in a specific position of a video signal based on the KBPS method is separated by the data slicer 105 and then demodulated by the demodulator 106 to then be input to the controller 107 in the form of digital data.

Figure 2:
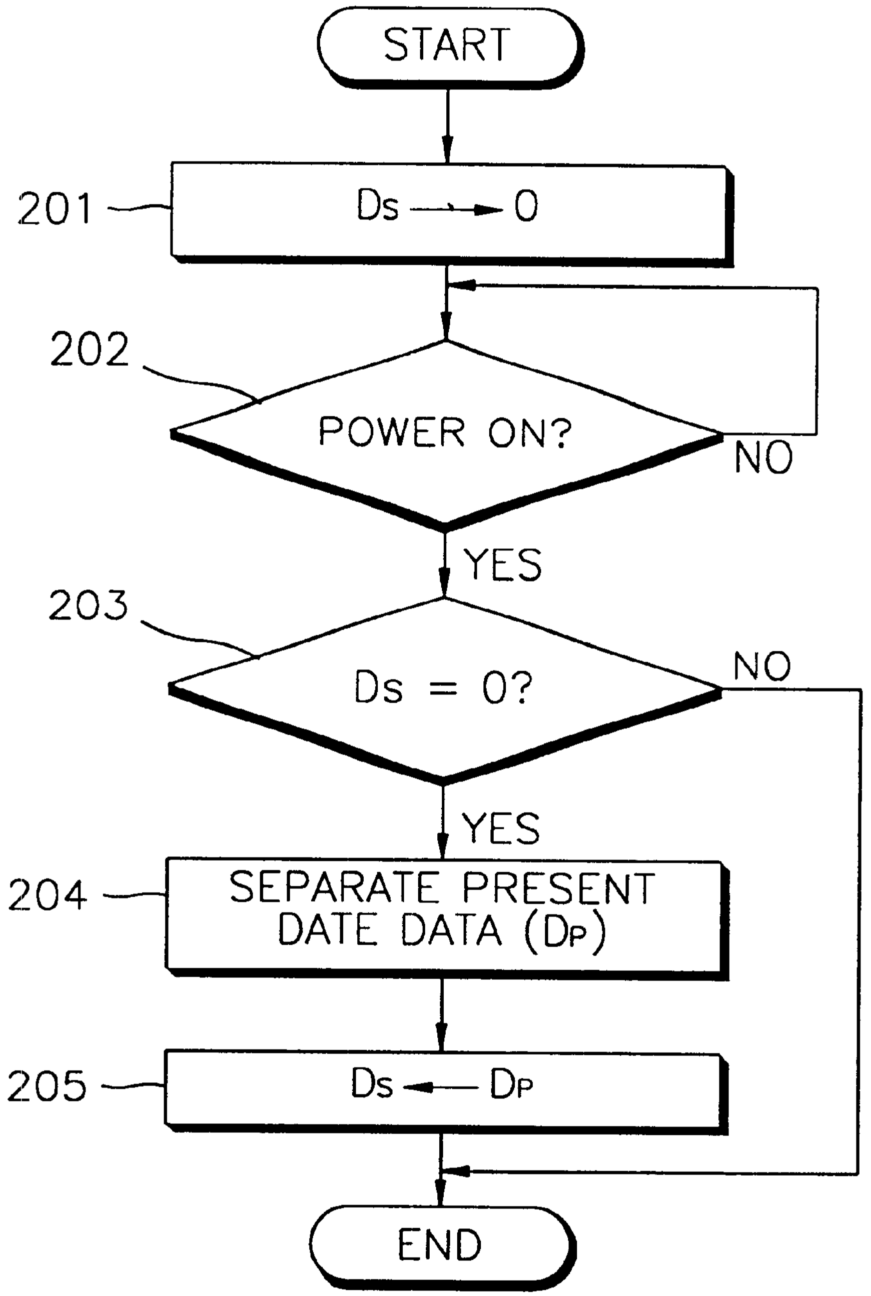
FIG. 2 is a flowchart illustrating a method for automatically storing information on the first use date of an electronic device according to the present invention.

A method for inputting and displaying service information of an electric product, according to the present invention, under the control of a controller 107, can be described with reference to FIG. 2.

In step 201, an initial value is set. That is, date data (Ds) related to the first date a product is used, which is one kind of "service information", is set to "0" and then stored at a specific address of the memory 108. This step is for identifying whether nor not date information was stored when the purchased product was used for the first time.

In step 202, it is determined whether a command is input, by user's key manipulation, to the controller 107 through the key input portion 109. In this case, the command corresponds to a first input command that occurs when first using the product, that is, a command issued through operation of the "power on" key, which may be a different command depending on the type of product involved. In other words, step 202 is to determine whether or not a key input command for initially operating the product after purchase is input.

In step 203, the date data Ds stored in a specific address of the memory 108 is read to determine whether it is "0" or not. If Ds is not "0", which means that the first use date of the product already has been stored in a specific address of a memory, the procedure is terminated.

In step 204, if it is determined in step 203 that Ds equals "0", the present date data Dp, which is received from the broadcasting program data input from the demodulator 106, is separated by the controller 107.

In step 205, the present date data Dp is rewritten in a specific address of the memory 108 in which the date data Ds is stored. The memory 108 is a nonvolatile flash memory, that is, even if power supply is interrupted, the data stored therein is not lost.

Also, the service information stored in the memory 108 can be effectively managed by setting the program of the controller 107 such that the service information can be changed by inputting a predetermined password.

Through the above-described steps, in the case when a user uses a purchased product for the first time, the information on the first use date of the product can be stored in a memory.

The method for displaying the information on the first use date of the product, stored in the memory, may be described with reference to FIG. 1. A specific key for repair service, which is also called a "factory key", is installed only in a special input device possessed by service centers or suppliers; the factory key is not installed in the key input portion 109 of a user's product. When the factory key is input, the controller 107 reads and decodes the date information stored in the specific address of the memory 108 and then displays the date information on a display via the video signal processor 104. The display may take the form of a CRT, an LCD or the like, according to the kind of product having the stored date data.

Alternatively, the service information can be displayed as follows. That is to say, a key for displaying the service information, which is called a "factory mode key", is installed in the user's key input portion 109. Then, only if this key is input, the service information stored in the memory is displayed. In this case, the controller 107 can be programmed such that the information on the first use date of the product, stored in the memory 108, cannot be changed.

Through the above-described steps, the information on the date of using a purchased product for the first time is automatically stored. Once the information on the first use date is stored in a memory, the stored information cannot be changed at the user's discretion. Thus, when a quality problem occurs in a product, it is possible to exactly determine whether the product is covered by the warranty period.

The present invention has been described by way of example of a television as an electronic product, for the convenience of explanation. However, it is evident to one skilled in the art that the invention can also be applied to a cellular phone, radio, or the like without departing from the scope of the invention. For example, the installation date of the program for the cellular phone is stored and then it is possible to verify that the cellular phone is covered by the period of warranty, at a repairing time in the future.

As described above, according to the present invention, when an electronic device is used for the first time after purchase, the date information necessary for verifying the warranty period is automatically stored, thereby allowing the definition of a precise beginning of a warranty period. Also, the cost for repairing products for which the warranty period has already elapsed can be greatly reduced.

What is claimed is:

1. A method for storing service information for an electronic device, said device having a controller and a memory, and being operative to receive an input signal containing data representing a present date, comprising the steps of:

(a) determining whether a predetermined command is input to the controller of the electronic device;

(b) if it is determined in step (a) that the predetermined command is input, separating the data representing a present date from the received input signal;

(c) determining whether initial data is present in a date data area of said memory for storing date data; and (d) only if it is determined in step (c) that the initial data is present, storing the data representing a present date in the date data area.

2. The method according to claim 1, wherein the predetermined command is a power-on command.

3. The method according to claim 1, wherein the step of storing the data in a memory comprises storing the data in a nonvolatile flash memory by which the data stored therein is not lost even if power supply is interrupted.

4. The method according to claim 1, further comprising the step of:

decoding and displaying the date data stored in the memory, if a predetermined command for displaying the date data is input.

5. The method according to claim 1, further comprising preventing the date data, indicating the first use date of the electronic device and being stored in the memory, from being changed.

6. The method according to claim 1, further comprising, permitting a change in the date data stored in the memory if a predetermined password is input.

7. A method for storing service information for an electronic device, said device having a controller and a memory, and being operative to receive an input signal containing data representing a present date, comprising the steps of:

(a) determining whether a predetermined command is input to the controller of the electronic device;

(b) if it is determined in step (a) that the predetermined command is input, determining whether initial data is present in an date data area of said memory for storing date data; and (c) only if it is determined in step (b) that the initial data is present, storing the data representing a present date in the date data area.

8. The method according to claim 7, wherein the predetermined command is a power-on command.

9. The method according to claim 7, further comprising preventing the date data, indicating the first use date of the electronic device and being stored in the memory, from being changed.

10. The method according to claim 7, further comprising, permitting a change in the date data stored in the memory if a predetermined password is input.

* * * * *